(12) United States Patent
Singh

(10) Patent No.: US 11,221,408 B2
(45) Date of Patent: Jan. 11, 2022

(54) RADAR UNIT ASSEMBLY FOR A VEHICLE

(71) Applicant: Nissan North America, Inc., Franklin, TN (US)

(72) Inventor: Jasvir Singh, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 222 days.

(21) Appl. No.: 16/146,984

(22) Filed: Sep. 28, 2018

(65) Prior Publication Data

US 2020/0103522 A1 Apr. 2, 2020

(51) Int. Cl.
| | | |
|---|---|---|
| *G01S 13/931* | (2020.01) | |
| *B60R 19/48* | (2006.01) | |
| *G01S 7/02* | (2006.01) | |
| *H01Q 1/32* | (2006.01) | |
| *B60R 19/52* | (2006.01) | |

(52) U.S. Cl.
CPC .......... *G01S 13/931* (2013.01); *B60R 19/483* (2013.01); *G01S 7/02* (2013.01); *B60R 2019/525* (2013.01); *G01S 7/027* (2021.05); *G01S 2013/93271* (2020.01); *G01S 2013/93275* (2020.01); *H01Q 1/3283* (2013.01)

(58) Field of Classification Search
CPC ......... G01S 13/931; G01S 2013/93271; G01S 2013/93272; G01S 2007/027; G01S 2013/9327; G01S 13/867; G01S 2013/93275; G01S 7/032; G01S 13/93; G01S 17/931; G01S 7/03; G01S 13/86; G01S 13/865; G01S 13/862; H01Q 1/42; H01Q 1/3233; H01Q 1/3283; H01Q 1/422; B60K 31/0008; B60R 19/483; B60R 13/005; B60R 19/52; B60R 2019/525; B60R 11/04
See application file for complete search history.

(56) References Cited

U.S. PATENT DOCUMENTS

| | | | |
|---|---|---|---|
| 9,776,585 B2 | 10/2017 | Wey et al. | |
| 9,828,036 B2* | 11/2017 | Frayer | .................... G01S 13/931 |
| 10,576,922 B2* | 3/2020 | Yasui | ..................... B60R 19/483 |
| 2005/0115943 A1* | 6/2005 | Winter | ..................... G01S 7/032 |
| | | | 219/202 |
| 2007/0118282 A1* | 5/2007 | Yamamoto | ............. G08G 1/163 |
| | | | 701/1 |
| 2011/0050525 A1* | 3/2011 | Sanada | ................ H01Q 1/3233 |
| | | | 343/760 |
| 2015/0210235 A1* | 7/2015 | Maji | ....................... B60R 19/52 |
| | | | 296/193.1 |
| 2015/0321548 A1* | 11/2015 | Hori | ......................... F01P 7/10 |
| | | | 180/68.1 |
| 2016/0137230 A1 | 5/2016 | Taneda | |
| 2016/0248152 A1* | 8/2016 | Takao | ............... B29C 45/14508 |
| 2017/0050509 A1* | 2/2017 | Aizawa | .................... B60R 19/52 |
| 2017/0057424 A1* | 3/2017 | Yamada | ................. G01S 13/931 |

(Continued)

FOREIGN PATENT DOCUMENTS

| | | |
|---|---|---|
| CN | 107433914 A | 12/2017 |
| FR | 3014404 A1 | 6/2015 |

*Primary Examiner* — Olumide Ajibade Akonai
(74) *Attorney, Agent, or Firm* — Global IP Counselors, LLP

(57) ABSTRACT

A radar unit assembly for a vehicle includes a vehicle body structure and a grille assembly mounted to the vehicle body structure. A radar unit is connected to the grille assembly.

14 Claims, 5 Drawing Sheets

(56) References Cited

U.S. PATENT DOCUMENTS

| | | | |
|---|---|---|---|
| 2017/0259754 A1* | 9/2017 | Gong | G09F 21/04 |
| 2018/0250856 A1* | 9/2018 | Watanabe | C23C 14/14 |
| 2019/0232886 A1* | 8/2019 | Okumura | H01Q 1/02 |
| 2020/0132813 A1* | 4/2020 | Yamamoto | B60R 13/04 |

\* cited by examiner

RADAR UNIT ASSEMBLY FOR A VEHICLE

BACKGROUND

Field of the Invention

The present invention generally relates to a radar unit assembly for a vehicle. More specifically, the present invention relates to a radar unit assembly in which a radar unit is connected to a grille assembly of a vehicle.

Background Information

Vehicles include radar units to facilitate detecting vehicles, pedestrians and/or other objects in front of the vehicle. This detection is used in connection with forward emergency braking and intelligent cruise control systems of the vehicle. The radar unit is mounted directly to a reinforcement beam extending in a lateral direction of the vehicle and disposed rearward of a grille assembly. Being mounted directly to the reinforcement beam subjects the radar unit to damage, thereby requiring additional structure to protect the radar unit.

Additionally, being mounted directly to the reinforcement beam results in the radar unit being disposed significantly rearward of the grille assembly. A large radar cone is emitted by the radar unit due to the rearward distance of the radar unit from the grille assembly. A large radome emblem on the grille assembly is required to allow the radar cone to pass therethrough. Accordingly, a need exists for a radar unit assembly for a vehicle in which a radar unit is connected to a grille assembly of the vehicle.

SUMMARY

One aspect of the present invention is to provide a radar unit assembly for a vehicle including a vehicle body structure and a grille assembly mounted to the vehicle body structure. A radar unit is connected to the grille assembly.

Another aspect of the prevent invent ion is to provide a radar unit assembly for a vehicle. A grille assembly is mounted to a vehicle body structure. The grille assembly includes a mounting receptacle. A radar unit is connected to the mounting receptacle. An emblem is connected to the mounting receptacle such that the emblem covers the radar unit.

Also other objects, features, aspects and advantages of the disclosed radar unit assembly will become apparent to those skilled in the art from the following detailed description, which, taken in conjunction with the annexed drawings, discloses exemplar embodiments of the vehicle body structure.

BRIEF DESCRIPTION OF DRAWINGS

Referring now to the attached drawings which form apart of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
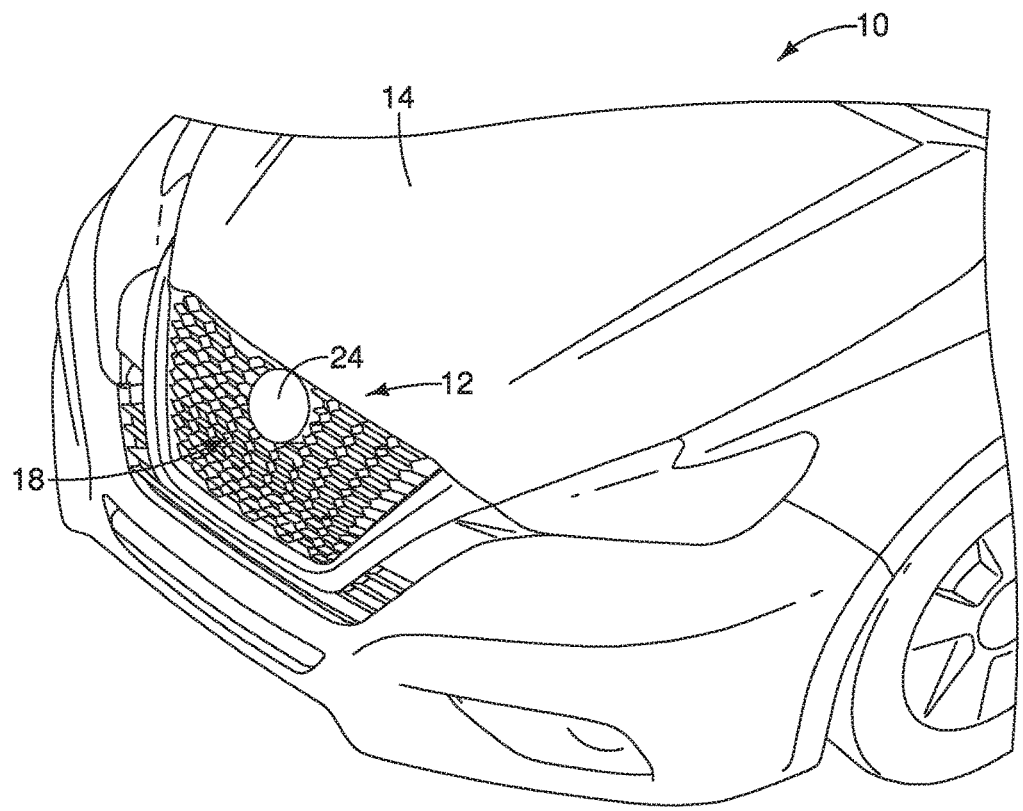
FIG. 1 is a perspective view of a vehicle including a radar unit assembly in accordance with an exemplary embodiment of the present invention.

Referring initially to FIG. 1, a vehicle 10 that includes a radar unit assembly 12 (FIGS. 2-8) is illustrated in accordance with an exemplary embodiment of the present invention.

The vehicle 10 has a vehicle body structure 14 with a front end structure 16. As shown in FIG. 1, the front end structure 16 includes a grille assembly 18 and a bumper fascia 20. The grille assembly 18 is connected to the bumper fascia 20 in a conventional manner to provide cooling air to a radiator disposed in an engine compartment of the vehicle 10. The bumper fascia 20 is attached to the vehicle body structure 14 in a conventional manner.

The radar unit assembly 12, as shown in FIGS. 1-9, includes the vehicle body structure 14, the grille assembly 18 mounted to the vehicle body structure 14, and a radar unit 22 connected to the grille assembly 18. The radar unit assembly 12 can further include an emblem 24 installed to the grille assembly 18 to cover the radar unit 22.

The grille assembly 18 has a frame member 26, as shown in FIGS. 2-6. The frame member 26 is preferably substantially U-shaped, but can have any suitable shape. A mesh portion 28 extends within an area defined by the frame member 26. The mesh portion 28 includes a plurality of openings 30 allowing air to flow therethrough and into the engine compartment. The plurality of openings 30 in the mesh portion 28 can have any suitable shape, such as an elongated hexagon as shown in FIGS. 2 -6. A stiffening member 32 can extend between opposite sides of the frame member to strengthen the grille assembly 18. The mesh portion 28 has a forward facing surface 28A and a rearward facing surface 28B.

Figure 2:
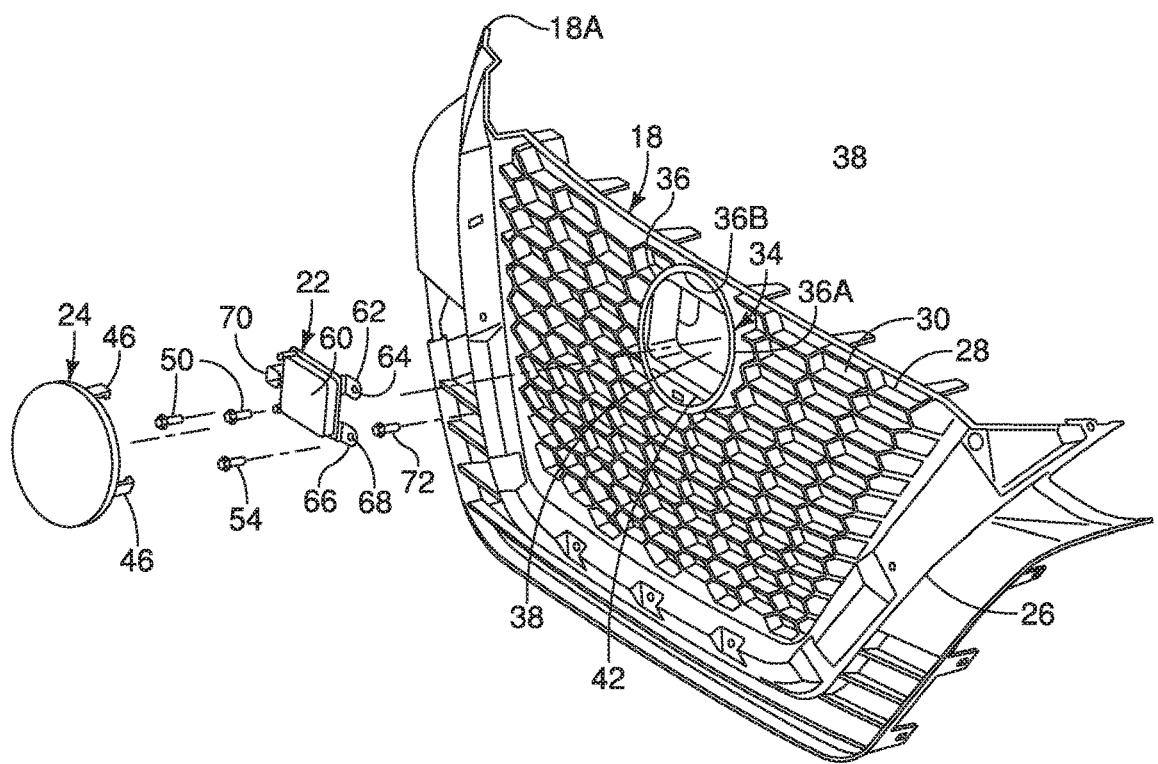
FIG. 2 is an exploded perspective view of a radar unit assembly in accordance with an exemplary embodiment of the present invention.
Figure 3:
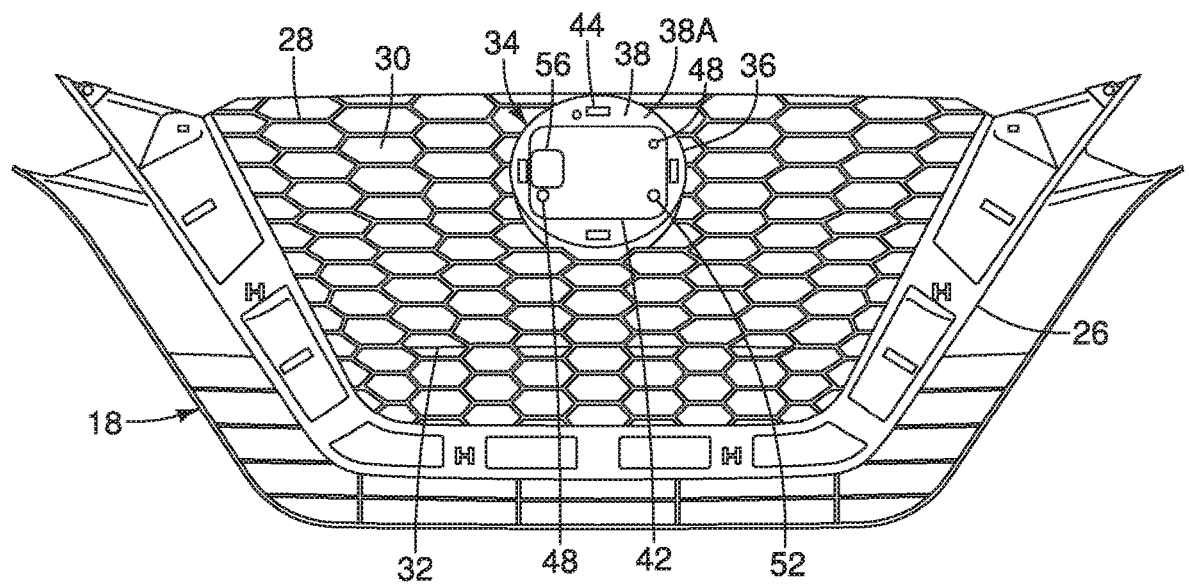
FIG. 3 is a front elevational view of a grille assembly of FIG. 2.
Figure 4:
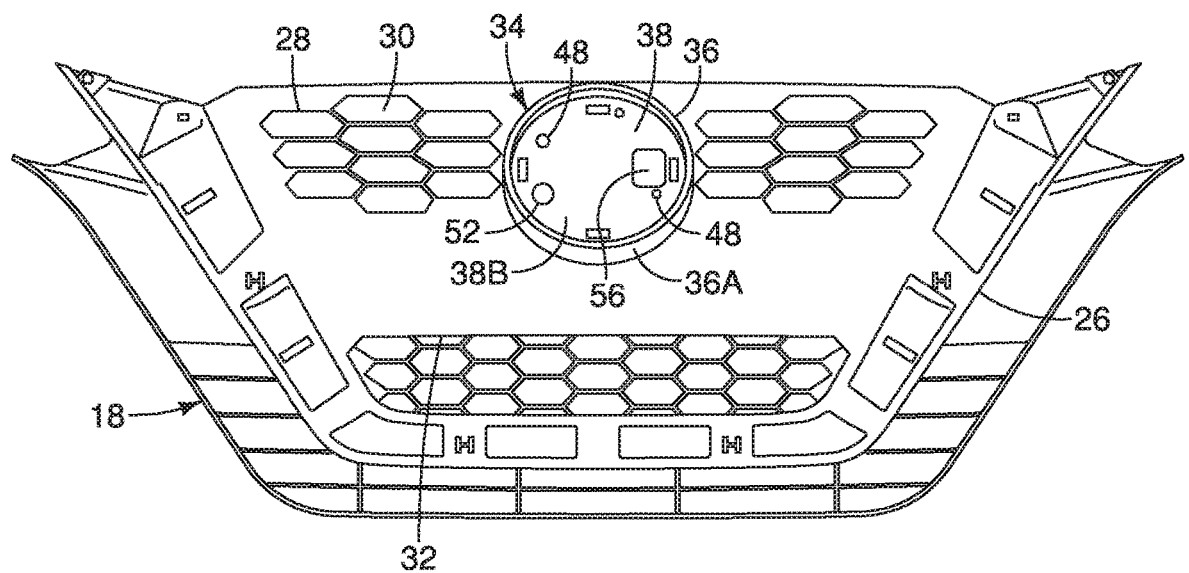
FIG. 4 is a rear elevational view of the grille assembly of FIG. 3
Figure 6:
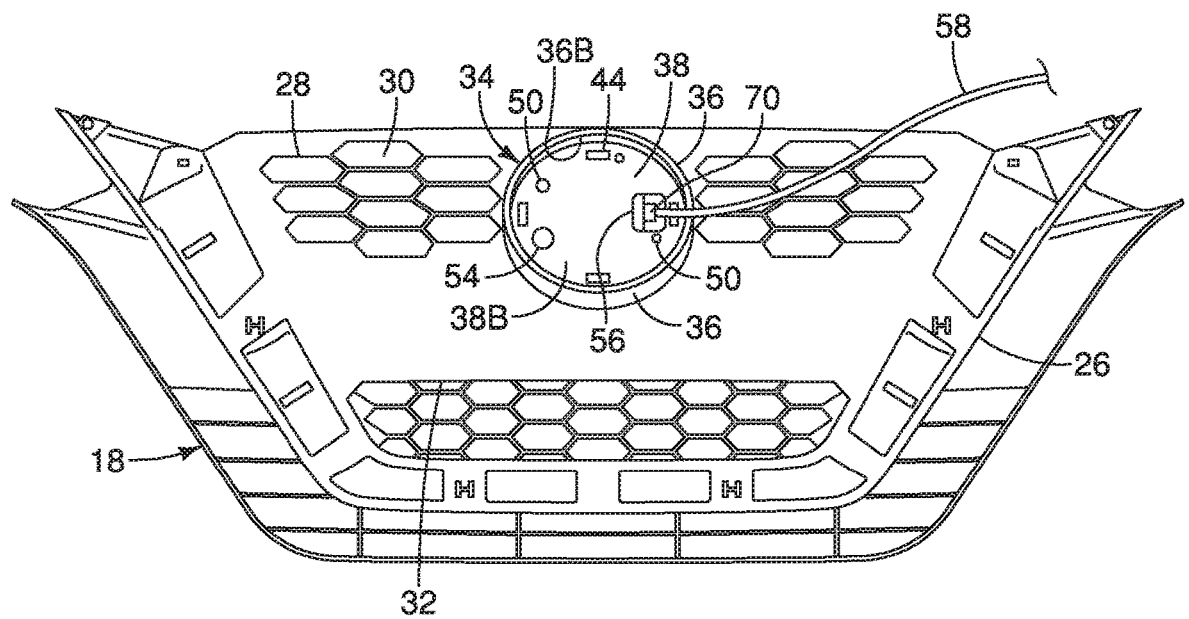
FIG. 6 is a rear elevational view of the radar unit connected to the grille assembly of FIG. 5.
Figure 7:
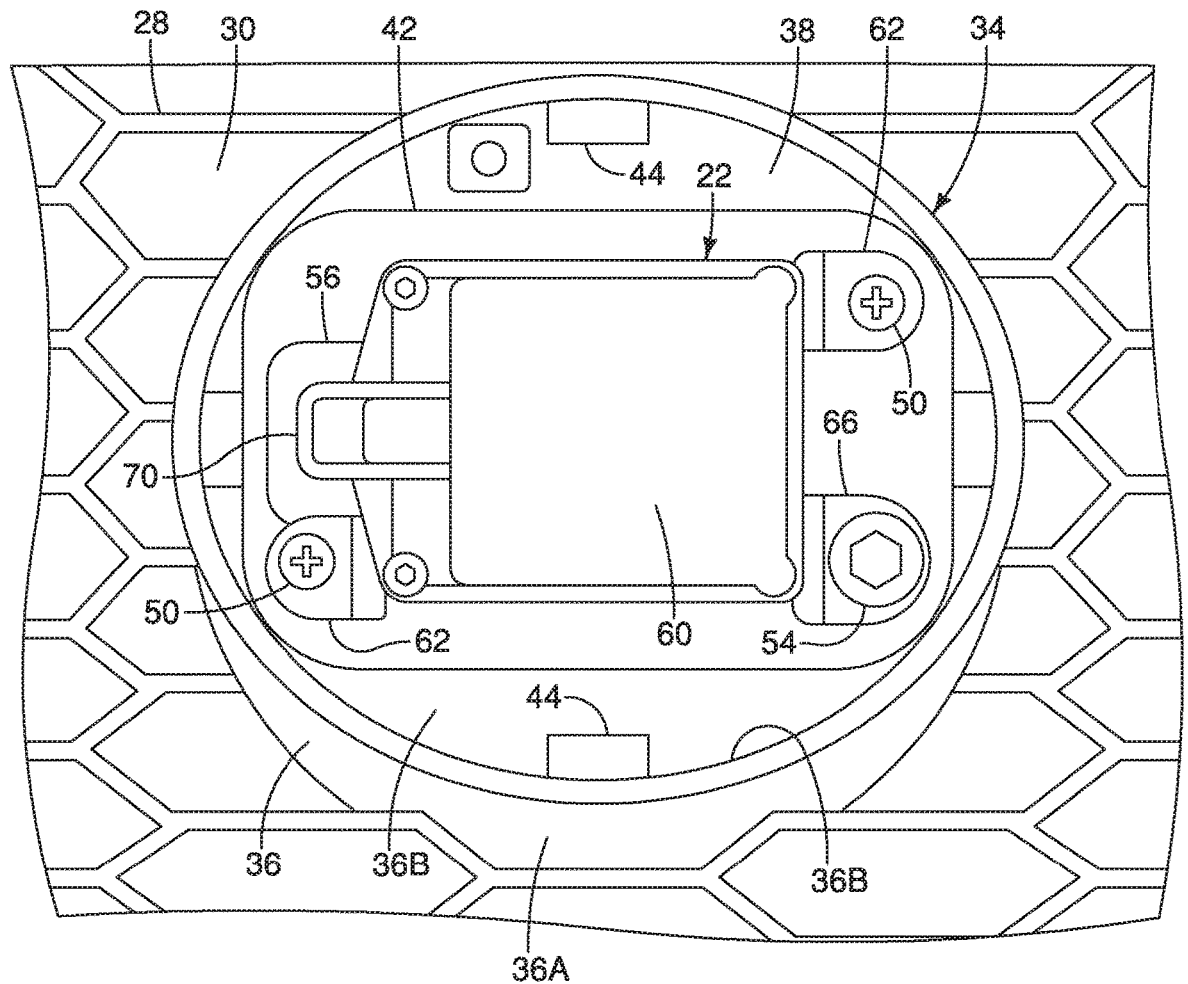
FIG. 7 is an enlarged front elevational view of the radar unit connected the grille assembly of FIG. 5.
Figure 8:
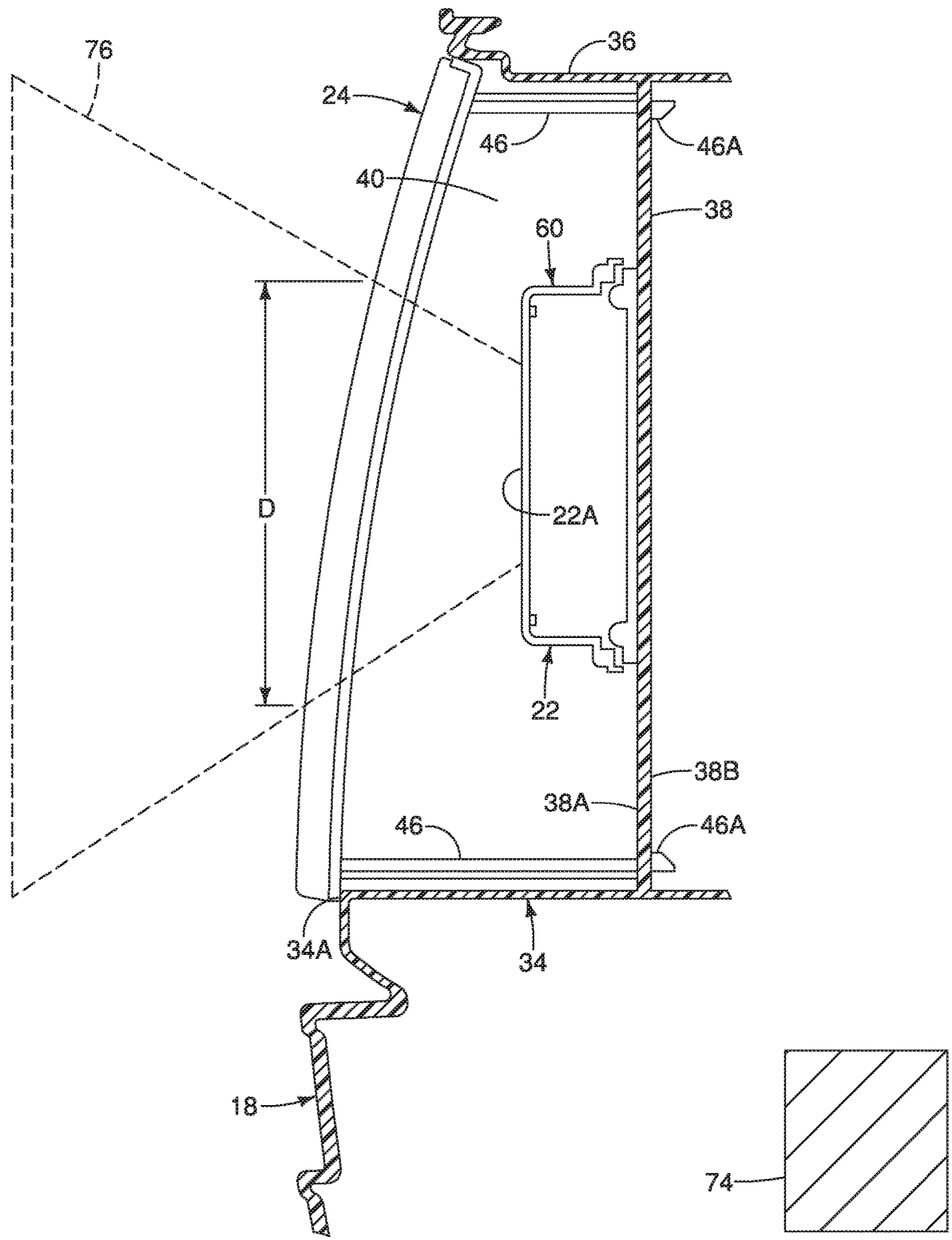
FIG. 8 is a side elevational view of the radar unit connected to the grille assembly of FIG. 5.

The grille assembly 18 includes a mounting receptacle 34, as shown in FIGS. 2-8. The mounting receptacle 34 includes a tubular member 36 connected to the mesh portion 28 of the grille assembly 18. The tubular member 36 includes an outer surface 36A connected to the mesh portion 28 and an inner surface 36B defining a passage through the tubular member 36. A base 38 extends across the inner passage defined by the inner surface 36B of the tubular member 36. Preferably, the base 38 extends across an entirety of the inner passage, as shown in FIGS. 3 and 4. A cavity 40 is defined by the base 38 and the tubular member 36 in a forward direction from a front surface 38A of the base 38, as shown in FIG. 8. The base 38 is preferably substantially perpendicular to a direction in which the tubular member 36 extends. The mounting receptacle 34 is preferably integrally formed with the grille assembly 18 as a one-piece member, such as by an injection molding process.

An inner wall 42 is disposed in the cavity 40, as shown in FIGS. 2, 3, 5 and 7. The inner wall 42 extends forwardly from the front surface 38A of the base 38. The inner wall 42 preferably has a substantially rectangular shape, although the inner wall 42 can have any suitable shape. The tubular member 36 extends further in a forward direction from the base 38 further than the inner wall 42, although the inner wall 42 can have any suitable length.

The front surface 38A of the base 38 faces in a forward direction of the vehicle 10 and an oppositely disposed rear surface 38B faces in a rearward direction of the vehicle 10. As shown in FIGS. 2 and 8, the base 38 is disposed rearward of the front surface 18A of the grille assembly 18.

A plurality of mounting openings 44 disposed in the base 38 are configured to receive mounting arms 46 of the emblem 24 to secure the emblem 24 to the mounting receptacle 34 of the grille assembly 18. Preferably, the base 38 has four mounting openings 44 disposed approximately ninety degrees apart. The plurality of mounting openings 44 are preferably disposed proximal the tubular member 36. The plurality of mounting openings 44 extend completely through the base 38 from the rear surface 38B to the front surface 38A. The plurality of mounting openings 44 are preferably disposed in the base 38 between the tubular member 36 and the inner wall 42.

A plurality of fastener openings disposed in the base are configured to receive fasteners to secure the radar unit 22 to the mounting receptacle 34 of the grille assembly 18. A pair of first fastener openings 48 are disposed proximal the tubular member 36, as shown in FIG. 3. Preferably, the pair of first fastener openings 48 are diametrically opposed. The first fastener openings 48 are configured to receive first fasteners 50. A second fastener opening 52 is disposed proximal the tubular member 36 such that one of the plurality of mounting openings 44 is disposed between the first fastener opening 48 and the second fastener opening 52 in a circumferential direction. The second fastener opening 52 is configured to receive a second fastener 54, which is different front first fasteners 50 received by the first fastener openings 48. The plurality of fastener openings 48 and 50 extend completely through the base 38 from the rear surface 38B to the front surface 38A. The plurality of fastener openings 48 and 52 are disposed within an area defined by the inner wall 42.

An electrical wiring opening 56 disposed in the base is configured to receive wiring 58, such as a wiring harness, to be connected to the radar unit 22. The wiring 58 provides power to the radar unit 22, communications between the radar unit 22 and an electronic controller, and any other electrical function required for operation of the radar unit 22. The electrical wiring opening 56 is disposed between the diametrically opposed first fastener openings 48, as shown in FIG. 3. Preferably, the electrical wiring opening 56 is disposed nearer to one of the diametrically opposed first fastener openings 48 than the other first fastener opening 48. The electrical wiring opening 56 extends completely through the base 38 from the rear surface 38B to the front surface 38A. The electrical wiring opening 56 is disposed in the base 38 within the area defined by the inner wall 42.

The radar unit 22 is connected to the mounting receptacle 34 of the grille assembly 18, as shown in FIGS. 2 and 5-7. The radar unit 22 is part of a radar system (not shown) of the vehicle 10 that includes, for example, the electronic controller (with a microprocessor and a memory) and a display (not shown) within a passenger compartment of the vehicle 10. The radar unit 40 detects proximity to other vehicles, pedestrians and/or obstacles forward of the vehicle 10. The electronic controller processes signals from the radar unit 40 and displays information for a vehicle operator's use. The display of the radar system can be replaced with, or can include, an audio device that provides audio signals to the vehicle operator in response to detection of:vehicles, pedestrians and/or objects ahead of the vehicle 10. Radar systems are conventional vehicle components, such that further description is omitted for the sake of brevity.

The radar unit 22 has a housing 60 having a plurality of mounting tabs. As shown in FIGS, 2, 5 and 7, the housing 60 preferably has three mounting tabs, although any suitable number can be used. Two first mounting, tabs 62 extend outwardly from opposite sides of the housing 60. Each of the first mounting tabs 62 has a first fastener opening 64 configured to receive one of the first fasteners 50. A second mounting tab 66 extends outwardly from one of the sides of the housing 60. The second mounting tab 66 has a second fastener opening 68 configured to receive the second fastener. One of the first mounting tabs 62 and the second mounting tab 66 are disposed on the same side of the housing 60, with the first mounting tab 62 being disposed above the second mounting tab 66.

An electrical wiring socket 70 is accessible from a rear side of the radar unit 22. Preferably, the electrical wiring socket 70 is disposed on an opposite side of the radar unit 22 from the second mounting tab 66. As shown in FIGS, 2 and 5, the electrical wiring socket 70 can be disposed above the first mounting tab 62.

The emblem 24, such as a radome, is connected to the grille assembly 18, as shown in FIG. 1. The emblem 24 is connected to the mounting receptacle 34, as shown in FIGS, 2. 5 and 6, such that the emblem 24 covers the radar unit 22. The emblem 24 is centered on the grille assembly 18 in a lateral direction of the vehicle 10, as shown in FIG. 1. The emblem 24 is made of a non-interfering material that allows radar signals to readily penetrate and pass therethrough. In other words, the emblem 24 is radar permeable.

The emblem 24 has a front surface 24A facing in the forward direction of the vehicle 10, and a rear surface 24B facing in the rearward direction of the vehicle 10. A plurality of resilient mounting arms 46 extend rearwardly from the rear surface 24B of the emblem, as shown in FIG. 2. Tabs 46A are disposed at the free ends of each of the mounting arms 46 to engage the rear surface 38B of the base 38 when the emblem 24 is connected to the mounting receptacle 34, thereby securely retaining the emblem 24 thereto. Preferably, the emblem 24 has our mounting arms 46, although any suitable number of mounting arms 46 can be used. The mounting arms 46 are preferably spaced equal distances apart in a circumferential direction. The front surface 24A of the emblem 24 can optionally include or define a vehicle manufacturer's logo.

Figure 5:
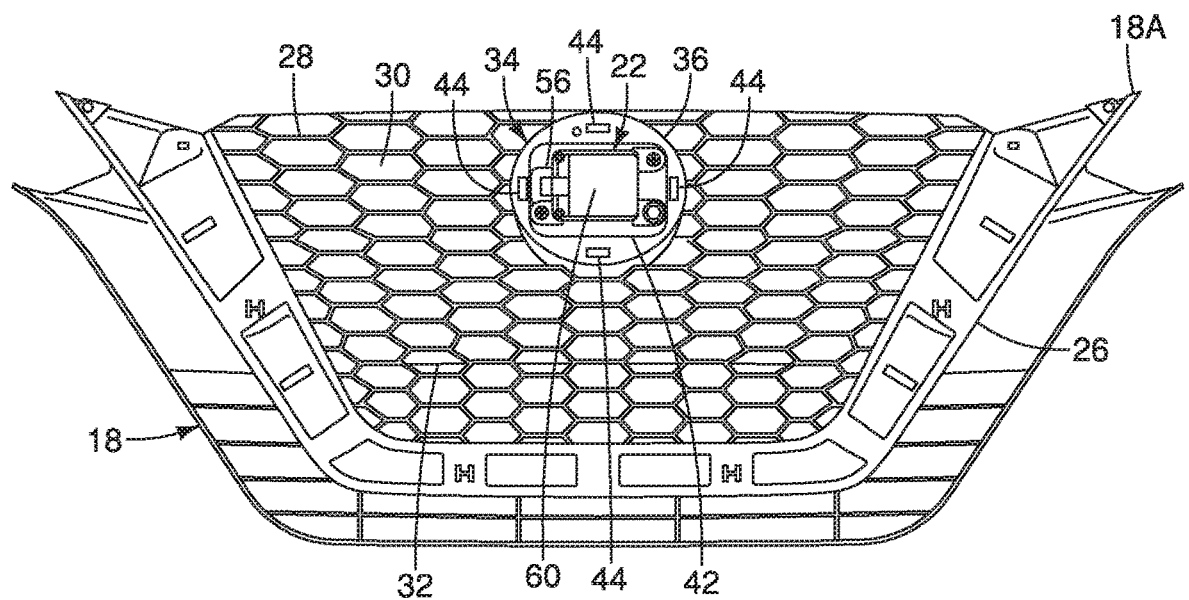
FIG. 5 is a front devotional view of a radar unit connected to the grille assembly of FIG. 2.

The radar unit 22 is connected to the mounting receptacle 34 of the grille assembly 18, as shown in FIGS. 2 and 5-7. The radar unit 22 is connected to the mounting receptacle 24 by aligning the first mounting tabs 62 with the first fastener openings 48 in the base 38 of the mounting receptacle 34 and the second mounting tab 66 of the radar unit 22 with the second fastener opening 52 in the base. As shown in FIG. 2, a threaded insert 72 is inserted in the second fastener opening 52 in the base 38 such that a head of the insert 72 is disposed between the second mounting tab 66 of the radar unit 22 and the base 38. The second fastener 54, such as a bolt, is then inserted through the second mounting tab 66 and into the insert 72 of the second fastener 54 such that the second fastener 54 is received by the second fastener opening 52. First fasteners 50, such as screws, are inserted through the first mounting tabs 62 and the first fastener openings 48 in the base 38, thereby securing the radar unit 22 to the mounting receptacle 34 of the grille assembly 18, as shown in FIGS. 5-7. The radar unit 22 is connected to the base 38 in the area defined by the inner wall 42. The electrical wiring 58 can then be connected to the electrical wiring socket 70 in the radar unit 22 by passing the electrical wiring 58 through the electrical wiring opening 56 from the rear side 38B of the base 38 of the mounting receptacle, as shown in FIG. 6.

The emblem 24 can then he connected to the mounting receptacle 34 of the grille assembly 18, as shown in FIG. 1. The mourning arms 46 of the emblem 24 are aligned with the mounting openings 44 in the base 38. The mounting arms 46 are inserted through the mounting openings 44 from the front side 38A of the base 38 of the mounting receptacle 34. The tabs 46A engage the rear surface 38B of the base 38, thereby preventing accidental removal of the emblem 24 from the mounting receptacle 34 of the grille assembly 18. The radar unit 22 and the emblem 24 are both directly connected to the base 38 of the mounting receptacle 34 of the grille assembly 18. The resilient mounting arms 46 can be flexed, such that the tabs 46A disengage the rear surface 38B of the base 38 to allow removal of the emblem 34 to access the radar unit 22.

When mounted, the radar unit 22 is spaced rearwardly from and aligned with the emblem 24, as shown in FIG. 8. The radar unit 22 is positioned and aligned with the emblem 24 such that radar signals from the radar unit 22 pass through the emblem 24 and radar signals reflected from nearby vehicle, pedestrians and/or objects back to the front end 16 of the vehicle body structure 14 pass through the emblem 24 to be received by the radar unit 22.

As shown in FIG. 8, the radar unit 22 is connected to the mounting receptacle 34 such that the front surface 22A of the radar unit 22 is disposed rearward of a front end 34A of the mounting receptacle 34 of the grille assembly 18. The radar unit 22 is disposed forward of a rearmost portion 18A of the grill assembly 18, as shown in FIGS. 2 and 5. The radar unit 22 is not connected to the laterally extending reinforcement beam 74, as shown in FIG. 8, thereby allowing the radar unit 22 to be disposed nearer to the emblem 24. By disposing the radar unit 22 nearer to the emblem, a diameter D of a radar cone 76 emitted by the radar unit 22 is smaller at the point where the radar cone 76 passes through the emblem 24 compared to when the radar unit 22 is disposed further rearwardly when connected to the reinforcement beam 74. As can be seen in FIG. 8, by moving the position of the radar unit 22 rearwardly, the diameter of the radar cone 76 at the point passing through the emblem 24 would be larger, thereby requiring a larger emblem 24. By connecting the radar unit 22 to the grille assembly 18, as shown in FIG. 8, the size of the emblem 24 can be reduced, thereby providing a more aesthetically pleasing emblem 24.

General Interpretation of Terms

In understanding the scope of the present invention, the term "comprising" and its derivatives, as used herein are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the, following directional terms "forward", "rearward", "above", "downward", "vertical", "horizontal", "below" and "transverse" as well as any other similar directional terms refer to those directions of a vehicle equipped with the title. Accordingly, these terms, as utilized to describe the present invention should be interpreted relative to a vehicle equipped with the title.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" an "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present, in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A radar unit assembly for a vehicle, comprising:
   a vehicle body structure;
   a grille assembly mounted to the vehicle body structure, the grille assembly including a mounting receptacle connected to the grille assembly, the mounting receptacle having a base having a mounting surface facing in a forward direction of the vehicle, the base of the mounting receptacle having a plurality of fastener openings, the mounting receptacle being integrally formed with the grille assembly as a one-piece member; and
   a radar unit connected to the forward facing mounting surface of the base of the mounting receptacle of the grille assembly,
   an opening in the base of the mounting receptacle being configured to receive an electrical wiring harness to be connected to the radar unit.

2. The radar unit assembly according to claim 1, wherein the base of the mounting receptacle is spaced rearward of a front of the grille assembly.

3. The radar unit assembly according to claim 2, wherein a front surface of the radar unit is disposed rearward of a front end of the mounting receptacle.

4. The radar unit assembly according to claim 1, wherein the radar unit has a plurality of fastener openings corresponding to the plurality of fastener openings of the mounting receptacle.

5. The radar unit assembly according to claim 4, wherein a plurality of fasteners are received by the fastener openings of the radar unit and the mounting structure.

6. The radar unit assembly according to claim 5, wherein at least one of the plurality of fasteners comprises an internally threaded sleeve receiving a bolt.

7. The radar unit assembly according to claim 1, wherein an emblem connected to the mounting receptacle of the grille assembly covers the radar unit.

8. The radar unit assembly according to claim 7, wherein the emblem is connected to the base of the mounting receptacle.

9. The radar unit assembly according to claim 7, wherein the emblem is made of a material allowing radar signals to pass therethrough.

10. The radar unit assembly according to claim 1, wherein the radar unit is disposed forward of a rearmost portion of the grille assembly.

11. A radar unit assembly for a vehicle, comprising:
a vehicle body structure;
a grille assembly mounted to the vehicle body structure, the grille assembly including a mounting receptacle connected to the grille assembly, the mounting receptacle having a base having a mounting surface facing in a forward direction of the vehicle, the base having a plurality of fastener openings, the base of the mounting receptacle being spaced rearward of a front of the grille assembly;
a radar unit connected to the forward facing mounting surface of the base of the mounting receptacle, the radar unit having a plurality of fastener openings corresponding to the plurality of fastener openings of the mounting receptacle;
a plurality of fasteners received by the fastener openings of the radar unit and the mounting structure, at least one of the plurality of fasteners comprising an internally threaded sleeve receiving a bolt; and
an emblem connected to the mounting receptacle and covering the radar unit.

12. The radar unit assembly according to claim 11, wherein
the mounting receptacle is integrally formed with the grille assembly as a one-piece member.

13. The radar unit assembly according to claim 11, wherein
the emblem is made of a material allowing radar signals to pass therethrough.

14. A radar unit assembly for a vehicle, comprising:
a vehicle body structure;
a grille assembly mounted to the vehicle body structure, the grille assembly including a mounting receptacle connected to the grille assembly, the mounting receptacle having a base having a mounting surface facing in a forward direction of the vehicle, the base of the mounting receptacle having a plurality of fastener openings, the mounting receptacle being integrally formed with the grille assembly as a one-piece member;
a radar unit connected to the forward facing mounting surface of the base of the mounting receptacle of the grille assembly, the radar unit having a plurality of fastener openings corresponding to the plurality of fastener openings of the mounting receptacle; and
a plurality of fasteners received by the fastener openings of the radar unit and the mounting structure, at least one of the plurality of fasteners comprising an internally threaded sleeve receiving a bolt.

* * * * *